United States Patent
Kipp

[11] 3,896,350
[45] July 22, 1975

[54] ENERGIZATION CIRCUIT FOR DYNAMO ELECTRIC MACHINES DRIVING, OR BRAKING VEHICLE WHEELS

[75] Inventor: Dieter Kipp, Aurich, Germany

[73] Assignee: Robert Bosch G.m.b.H., Gerlingen-Schillerhohe, Germany

[22] Filed: Jan. 16, 1974

[21] Appl. No.: 433,749

[30] Foreign Application Priority Data
Jan. 25, 1973 Germany............................ 2303555

[52] U.S. Cl.................................. 318/87; 318/375
[51] Int. Cl.² ......................................... H02P 3/00
[58] Field of Search ........ 318/63, 86, 87, 139, 362, 318/375

[56] References Cited
UNITED STATES PATENTS
1,791,848  2/1931  Somajni............................ 318/86 X
3,171,505  3/1965  Imelmann......................... 318/87 X Primary Examiner—Robert K. Schaefer
Assistant Examiner—W. E. Duncanson, Jr.
Attorney, Agent, or Firm—Flynn & Frishauf

[57] ABSTRACT

To prevent the effects of circulating currents in parallel connected dynamo electric machines, when controlled to be in braking mode, from affecting the field control of the machines, the armatures of the dynamo electric machines are connected in parallel when operating in braking mode, for example by a relay activated by operation of the brake pedal of the vehicle.

4 Claims, 1 Drawing Figure

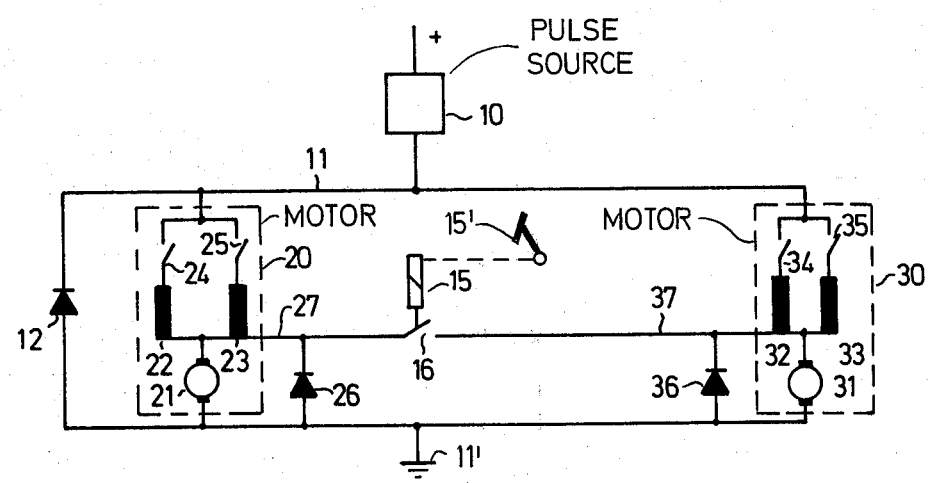

ENERGIZATION CIRCUIT FOR DYNAMO ELECTRIC MACHINES DRIVING, OR BRAKING VEHICLE WHEELS

Cross reference to related Patents: U.S. 3,568,022; 3,593,161; 3,731,169, assigned to the assignee of the present application.

The present invention relates to an energization circuit for dynamo electric machines connected to drive, or be driven by the wheels of a vehicle. When in driving mode, the dynamo electric machines operate as motors; when being driven by the wheels, the dynamo electric machines operate in a generator mode, for dynamic braking of the wheels. The motors, respectively, are connected to a wheel, each, at the right, or left side, respectively, of the vehicle. The circuit in accordance with the present invention selectively energizes the dynamo electric machines.

Known energization circuits for two motors frequently use series-connected motors, so that the field windings and the armature windings of the individual motors are serially connected. Both the right, and left motors, that is, the motors for the right and left wheels are supplied by a common pulse source. Such circuit arrangements, then, so control the motors or, rather, the dynamo electric machines, that the field windings can be reversely energized, in order to provide a counter current and effect dynamic braking.

Motors driving vehicle wheels are hardly ever completely identical mechanically, or electrically, and as a result, the armature voltages arising in the motors upon dynamic braking are not precisely identical. The overall voltage of the two dynamo electric machines, when operating in dynamic braking mode will be equal, due to their parallel connection; yet, because the armature voltages are hardly ever identical, compensation or balancing currents will flow which, in turn, influence the magnetic fields and, as a result, lead to uneven braking of the respective wheels to which the dynamo electric machines are connected.

It is an object of the present invention to electrically so connect the motors that the fields thereof are not differentially influenced by balancing, or compensation currents, so that the braking effort on the wheels of both sides of the vehicle will be even.

Subject matter of the present invention: Briefly, a cross connection is provided between the armatures of the dynamo electric machines, the connection including a switch, preferably relay controlled, which is closed only when the dynamo electric machines are in braking, i.e., in generator mode of operation. The relay can be controlled, for example, by the brake pedal of the vehicles.

The invention will be described by way of example with reference to the accompanying drawings, wherein the single FIGURE is a schematic circuit diagram illustrating the circuit of the present invention.

A pulse source 10 (see, for example, the cross-referenced patents) provides supply power from a source, not shown, to a positive bus 11. Return power is over chassis or ground, schematically indicated at 11'. Power from bus 11 is applied to two motors 20, 30. A free-wheeling diode 12 is connected in parallel to the motors. Motor 20 has an armature 21 and two fields 22, 23, which are controlled by respective selecting switches 24, 25. Motor 30, similarly, has an armature 31, fields 32, 33 each controlled by switches 34, 35, respectively. Diodes 26, 36 are connected across the armatures, which have terminals brought out at 27, 37, respectively. The terminals 27, 37 are cross connected through a controlled switch 16, for example under control of a relay coil 15 which, for example, is in turn controlled by operation of the brake pedal 15', shown schematically only.

Operation - dynamo electric machines 20, 30 in motor mode: The dynamo electric machines 20, 30 are connected to respective left, and right wheels of the vehicle. Upon energization of the pulse source 10, pulsed power will be applied between buses 11, 11'. Switches 24, 34 are closed, and relay 15 is inoperative, that is, contact 16 is open as shown in the FIGURE. The pulse source 10 supplies power to the two dynamo electric machines operating as motors. During the OFF time of pulses, that is, in the pulse intervals, free-wheeling diode 12 continues to carry motor current. The armature diodes 26, 36 are free-wheeling diodes for armature current alone. The direction of winding, and current flow of the fields 22, 32, connected by switches 24, 34 is so selected that the machines 20, 30 operate as motors.

Operation - braking mode: To operate the dynamo electric machines 20, 30 as dynamic brakes, switches 24, 34 are opened and, instead, switches 25, 35 are closed. This reverses the polarity of the field windings and current flow will now be over field windings 23, 33, thus providing for a reverse field, causing the motors to operate as generators. This, then, re-polarizes, or changes the direction of the armature voltage. The amplitude of the armature voltage is limited by the diodes 26, 36 connected in parallel thereto. This limit is required since, otherwise, machines 20, 30, operating as generators, would supply short circuit current over the free-wheeling diode 12, unless a signal from the pulse source 10 is provided which blocks free-wheeling diode 12. Short circuit operation at higher armature voltages might damage the machines 20, 30, and the free-wheeling diode 12, possibly even causing burn-out. In any event, change-over from motor mode of operation to braking mode of operation would result in a sudden jolt.

The relay contact 16 is closed, for example by control of the relay winding 15 upon operation of brake pedal 15'. The armatures 21, 31, therefore, are directly connected in parallel. Upon braking, circulating current can flow over the switch contact 16, which is a compensating current, resulting from differences between the machines 20, 30, respectively, and resulting in different armature voltages. If relay 15, and the switch contact 16 would not be provided, the effect of the field windings 23, 33 would result in a circulating current which would flow through the fields 23, 33 and hence would be additional to the field current flowing through the windings 23, 33, respectively, due to power from source 10 thus acting, additionally, on the excitation and resulting in additional, non-uniform uneven, and undesired braking of the respective dynamo electric machine 20, 30. The connection between the armatures, apart from the field windings 23, 33, respectively, avoids these circulating currents from flowing through the field windings.

Various changes and modifications may be made within the scope of the inventive concept; the motors have been shown schematically, with separate field windings and single-pole switches although, of course, different connections with more complicated switching arrangements can be used.

I claim:

1. In a drive system having at least two series-type dynamo electric machines (20, 30) connected to at least two loads, such as vehicle wheels, an energization circuit for said dynamo electric machines arranged to selectively connect said dynamo electric machines to operate in motor mode driving the loads, or to operate in generator mode, effecting dynamic braking of the loads, means (24, 25; 34, 35) controlling the direction of energization of the fields (22, 23; 32, 33) of the dynamo electric machines to selectively operate in either of said modes;

and switch means (15, 16) selectively directly cross connecting the armatures (21, 31) of the dynamo electric machines so as to place the armatures in a parallel circuit relationship when said mode control means (24, 25; 34, 35) energizes the fields in a direction to operate the dynamo electric machine in a generator-dynamic braking mode, said cross-connecting switch means forming a bypass circuit for circulating currents between the armatures (21, 31) arising due to differences in voltages across said armatures when the dynamo electric machines (29, 30) operate in generator mode, and said switch means selectively interrupting said parallel circuit cross connection of the armatures (21, 31) of the machines (20, 30) when the dynamo electric machines (20, 30) operate in motor mode.

2. System according to claim 1, wherein the switch means comprises a relay (15, 16) having its working contacts (16) connected to effect parallel connection of the armatures (21, 31) of the dynamo electric machines (20, 30).

3. System according to claim 2, wherein the load on the dynamo electric machines is, each, a vehicle wheel, and the relay (15, 16) is controlled by the brake control (15') of the vehicle.

4. System according to claim 1, wherein the switch means comprises a controlled switch (15, 16) directly connecting the armatures (21, 31) of the dynamo electric machines (20, 30) in parallel.

* * * * *